| United States Patent [19] | [11] Patent Number: 4,952,368 |
|---|---|
| Skenazi et al. | [45] Date of Patent: Aug. 28, 1990 |

[54] ZINC ALLOYS FOR ELECTROCHEMICAL BATTERY CANS

[75] Inventors: André Skenazi, Heverlee; Ivan A. Strauven, Neerpelt; Michel L. Cauwe, Overpelt, all of Belgium

[73] Assignee: Metallurgie Hoboken-Overpelt, Hoboken, Belgium

[21] Appl. No.: 410,959

[22] Filed: Sep. 22, 1989

[30] Foreign Application Priority Data

Sep. 23, 1988 [BE] Belgium ............................. 8801088

[51] Int. Cl.$^5$ ...................... C22C 18/00; C22C 18/04
[52] U.S. Cl. .................................. 420/513; 420/514; 420/520; 429/166
[58] Field of Search .................. 420/513, 514, 520; 429/166, 164

[56] References Cited

U.S. PATENT DOCUMENTS 2,233,578  3/1941  Boak .................................... 420/513

FOREIGN PATENT DOCUMENTS 1530948  5/1968  France .
2078812  10/1971 France .
61-58164  3/1986  Japan .

*Primary Examiner*—John P. Sheehan
*Assistant Examiner*—Robert R. Koehler
*Attorney, Agent, or Firm*—Fred Philpitt

[57] ABSTRACT

The alloys contain, besides zinc and unavoidable impurities,
0.05–0.8% of Pb and
either 0.005–1% of Al and 0.0005–0.1% REM, REM being a rare earth metal or a mixture of rare earth metals, or
0.005–1% of Mn or
0.005–1.5% of a mixture of Al, REM and Mn.

These alloys have a higher mechanical strength and a better resistance to corrosion than the known alloys with Pb-Cd or Pb.

23 Claims, No Drawings

ZINC ALLOYS FOR ELECTROCHEMICAL BATTERY CANS

The present invention relates to lead bearing zinc alloys for electrochemical battery cans.

A known lead bearing zinc alloy for battery cans contains, besides zinc and unavoidable impurities, 0.2–0.3% of lead and 0.05–0.07% of cadmium (by zinc is meant here and hereafter thermally or electrolytically refined zinc, and by % percentage by weight). This known alloy has the drawback to contain the toxic element Cd.

An other known lead bearing zinc alloy for battery cans contains, besides zinc and unavoidable impurities, only 0.4–0.8% of lead. This alloy does, certainly, not contain cadmium but it has a lower mechanical strength than the cadmium bearing alloy.

The aim of the present invention is to provide lead bearing zinc alloys for battery cans, which avoid the drawbacks of the before-mentioned. known alloys and which have moreover a higher mechanical strength and a better resistance to corrosion than the known alloy containing Cd.

The alloys according to the invention contain, besides zinc and unavoidable impurities,
0.05–0.8% of Pb and
either 0.005–1% of Al and 0.0005–0.1% of REM, REM being a rare earth metal or a mixture of rare earth metals, or
0.005–1% of Mn, or
0.005–1.5% of a mixture of Al, REM and Mn.

The lead content shall be at least 0.05%; if not, the alloys are too brittle, giving rise to difficulties when processing, particularly when rolling the cast alloy into a strip and when stamping slugs out of said strip (these slugs are later extruded into cans). The lead content is preferably at least 0.15%. The lead content shall not exceed 0.8%; at higher lead contents the mechanical strength is insufficient and corrosion problems may occur. Most preferred is a lead content from 0.2 to 0.3%.

When there is no manganese present, the aluminium content shall be at least 0.005% and the REM content at least 0.0005%; otherwise the mechanical strength and the resistance to corrosion are insufficient. The aluminium content, however, shall not exceed 1%. since at higher contents a two-phase structure is formed, which is subject to intergranular corrosion in the presence of lead. The REM content does not exceed 0.1% for the simple reason that the great affinity of the rare earth metals for oxygen makes it very hard to achieve higher contents; higher contents would moreover lower the mechanical strength of the alloy. The aluminium content is preferably 0.01–0.1% and the REM-content 0.001–0.01%.

In the absence of Al and REM, the manganese content shall be at least 0.005%; if not the mechanical strength and the resistance to corrosion are once more insufficient. The manganese content shall not exceed 1%, since at higher manganese contents, intermetallic Zn-Mn compounds are formed, which could produce cracks when the alloys are rolled. The manganese content is preferably 0.01–0.1%.

If aluminium, REM and manganese are simultaneously present, their total content shall be at least 0.005% in order to ensure sufficient mechanical strength and resistance to corrosion. Their total content shall not exceed 1.5% in order to prevent cracking problems when rolling and/or intergranular corrosion. The atomic ratio Al:Mn is preferably 0.3–10 and the atomic ratio Al:REM 30–200. The total content of Al, REM and Mn is preferably 0.01–0.1%.

REM can be any rare earth metal, such as for instance La or Ce, or any mixture of rare earth metals, such as for instance a mixture of La and Ce. For economic reasons REM is preferably misch metal, an alloy with some 45% of Ce, 45% of La and 10% of other rare earth metals.

The advantages of the alloys according to the invention are illustrated by the description hereafter of a comparative test.

Four alloys were prepared, whose compositions are as follows:
(1) Zn-0.22% of Pb - 0.043% of Al - 0.00% of Ce-0.001% of La
(2) Zn-0.28% of Pb - 0.036% of Mn
(3) Zn-0.23% of Pb - 0.059% of Cd
(4) Zn-0.41% of Pb Alloys (1) and (2) are alloys according to the invention, whereas the alloys (3) and (4) belong to the before discussed state of the art.

The zinc used for preparing the alloys was always thermally refined zinc and for alloy (1) use was made of an aluminium master alloy with 4% of La and 4% of Ce.

The alloys were processed into cans in an industrial unit in the traditional way: the cast material was rolled into strips, in which hexagonal slugs were stamped out; these slug: were extruded into cans. In this way 150 cans were produced from each alloy.

The tensile strength (in kg/mm2) was determined by means of a tensile test: tensile test pieces were cut from the car wall; for the tests 10 specimens were taken in the extrusion direction (A) and 10 perpendicular to the extrusion direction (B) the stretching rate was 1 cm/min.

The corrosion behaviour in a typical Leclanché electrolyt was evaluated as follows. The corrosion current density (I corr in $10^2$ $\mu A/cm2$) was determined by means of the anodic TAFEL line and the determination of the corrosion potential, starting from a beta-value of 30 mV/decade. Said value is, indeed, deemed in literature to be representative for zinc and zinc alloys. To record the TAFEL lines use was made of a slice taken from the bottom of the can The tests were carried out stationarily as well as with a rotating disc electrode. The scan speed was 1 mV/s. For each alloy, three measurements were made stationarily and three at 1000 rpm. The results of the several measurements are summarized in the table below.

TABLE

| Alloy | Tensile strength | | I corr | |
|---|---|---|---|---|
| | A | B | 0 rpm | 1000 rpm |
| (1) | 17.4 | 16.1 | 2 | 2 |
| (2) | 19.- | 16.7 | 2 | 1 |
| (3) | 16.6 | 15.- | 4 | 3 |
| (4) | 14.9 | 14.1 | 3 | 2.5 |

From the table appears that both the mechanical strength and the resistance to corrosion of the alloys (1) and (2) according to the invention are markedly better than these of the alloys (3) and (4) of the state of the art.

We claim:

1. Lead bearing zinc alloys for electrochemical battery cans consisting essentially of the alloy concentration basis 0.05–0.8% of lead and either 0.005–1% of Al and 0.0005–0.1% of REM, REM being a rare earth metal or a mixture of rare earth metals or
0.005–1% of Mn or
0.005–1.5% of a mixture of Al, REM and Mn,
the rest being zinc and unavoidable impurities.

2. Alloy according to claim 1 which contains at least 0.15% of Pb.

3. Alloy according to claim 2 which contains 0.2–0.3% of Pb.

4. Alloy according to claim 1 which contains, besides Zn, Pb and unavoidable impurities, 0.01–1% of Al and 0.001–0.01% of REM.

5. Alloy according to claim 2 which contains, besides Zn, Pb and unavoidable impurities, 0.01–1% of Al and 0.001–0.01% of REM.

6. Alloy according to claim 3 which contains, besides Zn, Pb and unavoidable impurities, 0.01–1% of Al and 0.001–0.01% of REM.

7. Alloy according to claim 1 which contains, besides Zn, Pb and unavoidable impurities, 0.01–0.1% of Mn.

8. Alloy according to claim 2 which contains, besides Zn, Pb and unavoidable impurities, 0.01–0.1% of Mn.

9. Alloy according to claim 3 which contains, besides Zn, Pb and unavoidable impurities, 0.01–0.1% of Mn.

10. Alloy according to claim 1 which contains Al, REM and Mn and that the atomic ratio Al:Mn ranges from 0.3 to 10 and the atomic ratio Al:REM from 30 to 200.

11. Alloy according to claim 2 which contains Al, REM and Mn and that the atomic ratio Al:Mn ranges from 0.3 to 10 and the atomic ratio Al:REM from 30 to 200.

12. Alloy according to claim 3 which contains Al, REM and Mn and that the atomic ratio Al:Mn ranges from 0.3 to 10 and the atomic ratio Al:REM from 30 to 200.

13. Alloy according to claim 1 wherein the total content of Al, REM and Mn is 0.01–0.1%.

14. Alloy according to claim 2 wherein the total content of Al, REM and Mn is 0.01–0.1%.

15. Alloy according to claim 3 wherein the total content of Al, REM and Mn is 0.01–0.1%.

16. Alloy according to claim 10 wherein the total content of Al, REM and Mn is 0.01–0.1%.

17. Alloy according to claim 11 wherein the total content of Al, REM and Mn is 0.01–0.1%.

18. Alloy according to claim 12 wherein the total content of Al, REM and Mn is 0.01–0.1%.

19. Alloy according to claim 1 wherein REM is misch metal.

20. Casting for being processed into cans for electrochemical batteries, said casting consisting of an alloy according to claim 1.

21. Rolled strip for being punched into slugs said rolled strip consisting of an alloy according to claim 1.

22. Slug for being extruded into a battery can, said slug consisting of an alloy according to claim 1.

23. Can for electrochemical battery, said can consisting of an alloy according to claim 1.

* * * * *

UNITED STATES PATENT AND TRADEMARK OFFICE
CERTIFICATE OF CORRECTION

PATENT NO. : 4,952,368
DATED : August 28, 1990
INVENTOR(S) : SKENAZI et al

It is certified that error appears in the above-identified patent and that said Letters Patent is hereby corrected as shown below:

column 1, line 21, "." should be deleted column 1, line 47, "." should be ","

column 2, line 17, "0.00% of Ce" should be "0.001% of Ce"

column 2, line 32 "slug :" shold be "slugs"

column 2, line 36 "car" should be "can"

column 2, line 38 "(B)" should be "(B);"

column 3, lines 2-3, "the alloy concentration basis" should be ", in weight percent,".

Signed and Sealed this

Tenth Day of March, 1992

*Attest:*

HARRY F. MANBECK, JR.

*Attesting Officer*     *Commissioner of Patents and Trademarks*